United States Patent [19]

Abraham et al.

[11] Patent Number: 4,952,416
[45] Date of Patent: * Aug. 28, 1990

[54] PROCESS FOR PRODUCING INSTANTIZED PARBOILED RICE

[75] Inventors: Thomas E. Abraham; Jacque L. Malfait; Arnold J. White, all of Cobourg, Canada

[73] Assignee: General Foods, Inc., Don Mills, Canada

[*] Notice: The portion of the term of this patent subsequent to Aug. 15, 2006 has been disclaimed.

[21] Appl. No.: 345,931

[22] Filed: May 1, 1989

Related U.S. Application Data

[63] Continuation-in-part of Ser. No. 236,565, Aug. 25, 1988, Pat. No. 4,857,348.

[51] Int. Cl.$^5$ ............................................... A23B 9/00
[52] U.S. Cl. ................................. 426/462; 426/459; 426/460; 426/461
[58] Field of Search ................ 426/459, 460, 461, 462

[56] References Cited

U.S. PATENT DOCUMENTS

| | | | |
|---|---|---|---|
| 3,189,462 | 6/1965 | Autrey et al. | 426/462 |
| 3,408,202 | 10/1968 | Serbia et al. | 426/461 |
| 4,707,371 | 11/1987 | Yamaguchi | 426/462 |

Primary Examiner—Donald E. Czaja
Assistant Examiner—Helen Pratt

[57] ABSTRACT

A process is described to provide an improved instantized parboiled rice that maintains the texture, appearance and flavor characteristics of eating quality parboiled finished rice product.

7 Claims, 1 Drawing Sheet

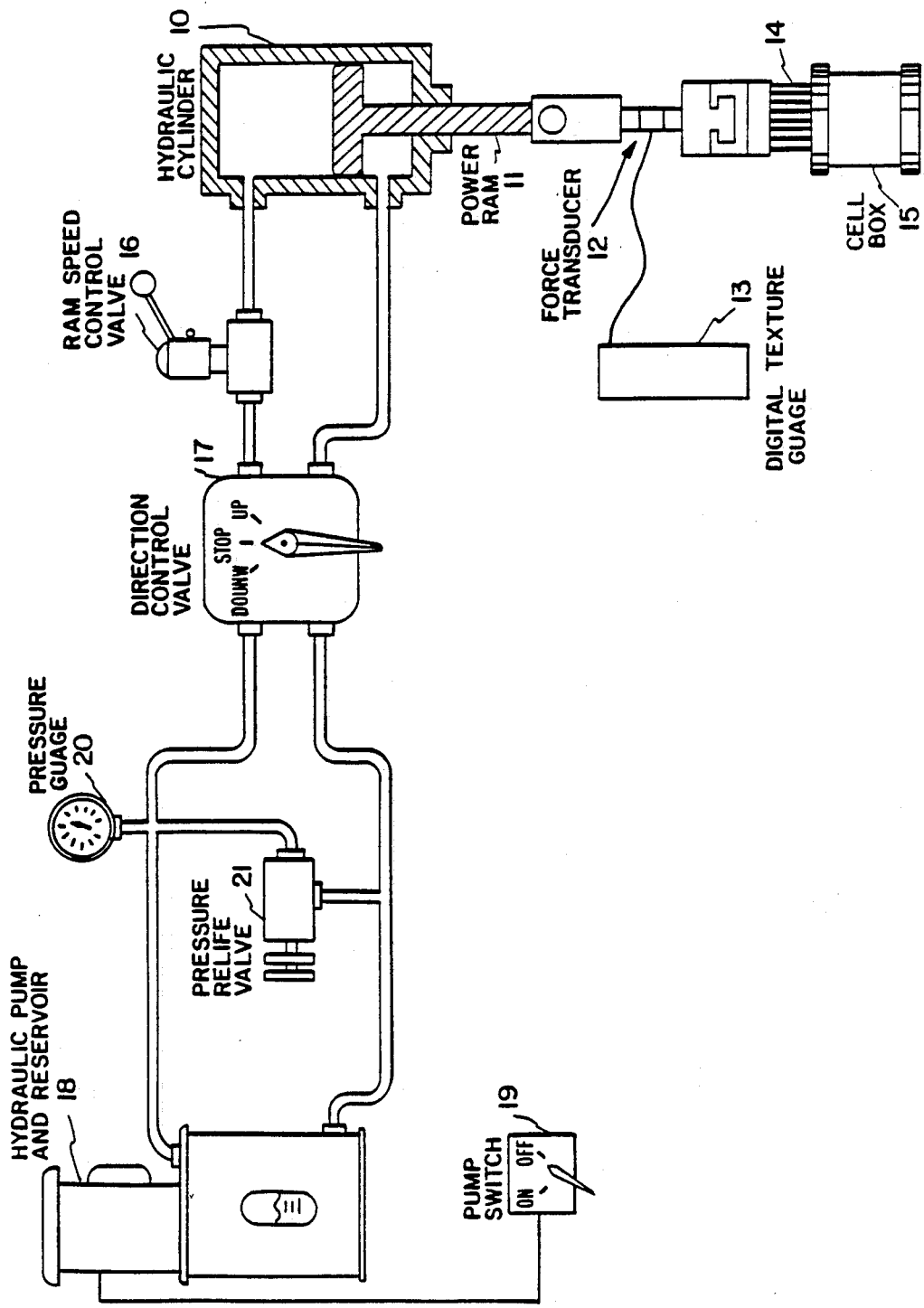

PROCESS FOR PRODUCING INSTANTIZED PARBOILED RICE

This application is a continuation in part of Copending U.S. application Ser. No. 236,565 filed Aug. 25, 1988, now U.S. Pat. No. 4,857,348, issued Aug. 15, 1989.

TECHNICAL FIELD

This invention relates to a process for producing an improved instantized parboiled rice by incorporating specific amounts of water into long grain milled parboiled rice, reducing the water content over a period of time to obtain a texture having a specific range of a shear press value to provide an instantized product capable on rehydration to produce a rice product having the texture, appearance and flavor characteristics of eating quality parboiled rice.

BACKGROUND OF THE INVENTION

Parboiled rice is preferred over white rice by many consumers for its texture, appearance, flavor, aroma, and recipe tolerance. However, due to the pretreatment of the rice in the paddy form which produces parboiled rice, the grain is rendered longer-cooking than milled white rice. Most parboiled rice of commerce calls for immersion-cooking of at least 20 minutes in boiling water to prepare the parboiled rice to the desired edibility. During the process of converting rough rice to parboiled rice, the paddy is soaked, steamed, dried, and then milled. It appears that the heat treatment involved in this processing reduces product rehydratability and renders it harder and longer to cook.

Many attempts have been made to produce an instantized parboiled rice having the texture, appearance and flavor characteristics of eating quality parboiled rice but success has not been completely achieved. In U.S. Pat. No. 2,720,460 entitled "Production of Quick-Cooking Rice" techniques are described for producing instantized rice by hydrating rice grains in stages but did not consider parboiled rice as the starting material. U.S. Pat. No. 2,438,939 entitled "Quick Cooking Rice And Process For Making Same" describes a milled rice (not parboiled) cooked in boiling water until its starch is substantially gelatinized and its moisture content is raised to about 65–70%, cooled and quick dried by removing moisture from its surface at a rate sufficiently faster than it can diffuse thereto from their interiors at 140° C. for 10 to 15 minutes. Another U.S. Pat. No. 3,408,202 entitled "Process For Preparing A Quick-Cooking Rice" prepares a quick cook rice by soaking parboiled rice in water below its gelatinized temperature 160° F. to increase its moisture content to 15–50%, steaming the rice to temperatures of 180–212° F., reimmersing the rice in water below 160° F., steamed again and reimmersed again and then dehydrating the cooked rice. This multiple step process is time consuming and complicated. U.S. Pat. No. 2,903,360 entitled "Method Of Making Quick-Cooking Cereals From Parboiled Grains" soaks parboiled rice in water for 2 to 5 hours at temperatures between about 50° F. and 82° F. to a moisture content between 45 and 55% compared to temperatures between about 130° F. to 160° F. to a moisture content between 65% and 77%. The rice is then boiled in water for about 2 to 5 minutes, separating the boiled grains from the boiling water, spraying the grains with cold water to about 130° F., squeezing the cooled grains to ⅓ to 1/5 their thickness, washing and drying the grains. This multiple step process is also time consuming and complicated. Finally, U.S. Pat. No. 4,361,593 entitled "Process For Preparing Dry Quick-Cooking Parboiled Rice And Product Thereof" prepares dry parboiled rice by soaking rough rice in water to increase the moisture content to 30 to 45% by weight without effecting substantial gelatinization, steaming the hydrated rice under conditions effective to partially gelatinize the starch granules, tempering the partially-gelatinized rice at temperaturs below the gelatinization temperature of the starch while maintaining the level of moisture above 20%, drying the rice to a moisture content less than 15% and milling the rice. This process occurs within the hull of the rice. Other references are known to produce quick-cooking rice but no references are known which describe the process of this invention relating to the production of an instantized parboiled rice which is unique in its operation to provide an outstanding quality product having the texture, appearance and flavor characteristics of eating quality parboiled rice finished product.

SUMMARY OF THE INVENTION

The present invention provides a process for making an improved instantized parboiled rice which comprises incorporating about 68 to about 78% of water into long grain milled parboiled rice which has been substantially gelatinized. The resulting product is carefully dried to reduce the water content of the rice to about 6 to about 14% over a period of time to obtain a rice having a texture with a shear press value in the range from about 60 to below 85 lbs/force, preferably about 64 to about 74 lbs/force, and having a 4½ to 7½ minute stand when an equal volume of rice is combined with an equal volume of boiling water to produce an instantized eating quality finished rice product.

DETAILED DESCRIPTION OF THE INVENTION

The starting rice material for this invention is a parboiled rice typically prepared by soaking rough rice paddy (unmilled rice, substantially as it comes from the field) in cold, warm or hot water for a substantial period of time, until the rice kernels have increased their moisture content, generally to at least above 20%; steaming the rice, generally at super-atmospheric pressure to substantially gelatinize at least 85% and up to 95 to 100% of the starch and the rice is dried and milled. This procedure ensures separateness of grain but it is well known that parboiled rice requires increased cooking time to fully rehydrate the dry parboiled rice to achieve a cooked product.

By this invention, long grain milled parboiled rice substantially gelatinized, is exposed to water at temperatures from about 160° F. to 212° F. and higher by soaking, immersion, steaming and the like for a period of time to increase the water content of the rice to about 68 to about 78% by weight, preferably about 72 to about 76%, of the total parboiled rice. When the water content of the parboiled rice is achieved, the product is dehydrated using drying temperatures in the range from about 260° F. to about 325° F., preferably from about 260° F. to about 305° F. over a period of time such as 10 to 30 minutes, preferably 11 to 15 minutes to reduce the water content of the rice to about 6 to about 14% by weight, preferably about 7% to about 11%, to produce a rice having a texture with a shear press value in the range from about 60 to below 85 lbs/force, preferably about 84 to about 74 lbs/force. This rice will have a 4½ to 7½ minute stand preferably 5 minute stand which means that when an equal volume of rice is combined with an equal volume of boiling water, the product produced is an instantized eating quality finished parboiled rice product.

The "long grain rice" as used herein and known in the art, is defined as a rice which is long and slender in shape, as much as 4 to 5 times as long as it is wide. When cooked, the grains tend to separate and are light and fluffy.

The drying procedure used to dehydrate the high water containing rice is a long drying procedure when compared to the quick drying dehydrating procedure of regular milled rice (not parboiled) normally taking 10 to 15 minutes.

The so called "long drying" technique of this invention is conducted to achieve specific texture with a specific shear press value as described above.

U.S. Pat. No. 2,972,884 issued Feb. 28, 1961 describe a tenderness testing apparatus for food products. The apparatus and test has become known as "shear press". This test involves the use of a standardized container and cell within which a suitable quantity of product such as rice is placed and the product is penetrated by a multiple bladed ram. The ram as it is passing through the material, operates to shear the individual particles or fibers. The force necessary to produce penetration is considered a measure of the tenderness of the product. Under carefully controlled conditions, the numerical value of force or thrust for a given product has been found to have a good correlation with tenderness. In the operation of the shear press test, especially for rice kernels, the rate at which the blade assembly of the ram is driven through the cell box is an important parameter which must be controlled if the end result is to be accurate and reproducible. The force applying mechanism used in this test is a hydraulic system operated under precise conditions.

The shear press value of the dehydrated long grain parboiled rice product is determined on an Allo-Kramer Shear Press Model SP12 equipped with FTA-300 force transducer and a TG-4 (Food Technology Corp.) digital texture gauge, as described in the accompanying drawing as follows: A hydraulic cyclinder 10 with a power ram 11, containing a force transducer 12 and a blade assembly containing 10 equally placed blades attached as vertical blades 14 is used which contact and completely penetrate the rice sample in the cell box 15. The force transducer 12 is connected to a digital texture gauge 13 to measure the force produced. A directional control value 17 is set to activate the power ram 11 in the hydraulic cyclinder 10. A ram speed control value 16, controls the speed of the power ram 11. A hydraulic pump and reservoir 18 is activated by the pump switch 19 to supply the pressure to the hydraulic cyclinder 10. The pressure is read on the pressure guage 20 and can be controlled by a pressure relief value 21.

The texture of the rice product is measured by the shear press model in the following manner: The rice product, 131.1 grams, is covered by an equal volume of boiling water (212° F.) with stirring. After 5 minutes of standing the water is drained for 30 seconds while the blade assembly is mounted on the shear press and locked into position. The cell box, cover and blades are immersed in 75°–85° F. water until required for use. AT the end of the drain period, the rice product is placed into the cell box and leveled without compressing the product. The cover is placed on the cell box and inserted into position under the blade assembly. The hydraulic pump is turned on and the direction control value is placed in the down position and the stroke time of the power ram is 2 minutes, 30 seconds ±10 seconds. The digital texture guage, periodically standardized to obtain the accurate reading, is read in terms of pounds/force.

The cell box is of sufficient size to hold 131 grams of rice which has been covered with an equal volume of boiling water and after 5 minutes of standing, the water is drained for 30 seconds. After draining, the rice product is placed into the cell box and leveled without compressing the product. The cell box or shear cell is formed in three parts, a top plate, a bottom plate and a hollow body portion. The top and bottom plates are slotted for receiving the 10 equally spaced blades passing through the rice being tested. The cell box has dimensions of 6.6 cm×6.5 cm×6.3 cm (volume=270.3 cm$^3$) and made out a suitable material such as stainless steel, mild steel or the like. The cell box has guide slots on the upper and bottom sides of the cell box to receive the fingers or blades of the ram and exact alignment of the blade slots is essential so the blades will pass through and penetrate the rice product.

The following Examples demonstrate the invention in greater detail. It is understood that these Examples are furnished only by way of illustration and not limitation.

EXAMPLE 1

Raw Material: Long grain milled parboiled rice substantially gelatinized.

Parboiled rice is metered into a flume tank at a rate of 750 lbs./hr. The water temperature is 205° F., and flume retention time is 15 seconds before the rice enters the front of the steamer (cooker). In the steamer, the rice is cooked on a moving belt by means of topical water addition and steam addition from the top and bottom of the steamer belt (atmospheric pressure). The spray water temperature is 195 to 205° F. at a rate of approximately 175 pounds per hour and covers the entire rice bed. The rice is cooked to the desired moisture (72–74%) with a retention time of 40 minutes in the 39 foot long, 6 foot wide steamer. At the end of the steamer, the rice is flumed with unheated water (Maximum flume water temp. 100° F.) to a drain belt. At the drain belt, the rice is spread evenly onto the drain belt and excess surface water is dripped off before rice enters the dryer. The rice is evenly spread onto the dryer belt with a bladed real (fluffer—like a lawn mower real). Rice entering the drier is approximately ¾ to 1 inch deep on the belt. Retention time in the dryer is 40 minutes with varying temperatures in each of three drying zones: Zone one 290 to 310° F., zone two 290 to 310° F. and zone three at 130 to 145° F. The rice exits the dryer with a moisture content of 7 to 11%.

Finished Product

This instanized rice product will have a shear press value of 100 to 105 lbs/force at a 5 minute stand with equal volumes of rice and boiling water. The density of the finished product in the dry form will be in the range of 400 to 475 grams per liter.

This superior rice product after rehydration for 5 minutes, will be smooth with separate kernels (not sticky) and, will have a desirable chewy and rubbery texture. This product is firm and fluffy not mushy or sticky. The final eating moisture at a 5 minute stand is 67%.

EXAMPLE 2

Raw Material: Long grain milled parboiled rice substantially gelatinized.

Parboiled rice is metered into a flume tank at a rate of 750 lbs./hr. The water temperature is 205° F., and flume retention time is 15 seconds before the rice enters the front of the steamer (cooker). In the steamer the rice is cooked on a moving belt by means of topical water addition and steam addition from the top and bottom of the steamer belt (atmospheric pressure). The spray water temperature is 195 to 205° F. at a rate of approximately 175 pounds per hour and covers the entire rice bed. The rice is cooked to the desired moisture (72-74%) with a retention time of 40 minutes in the 39 foot long, 6 foot wide steamer. At the end of the steamer, the rice is flumed with unheated water (Maximum flume water temp. 100° F.) to a drain belt. At the drain belt, the rice is spread evenly onto the drain belt and excess surface water is dripped off before rice enters the dryer. The rice is evenly spread onto the dryer belt with a bladed real (fluffer—like a lawn mower real). Rice entering the drier is approximately ¾ to 1 inch deep on the belt. Retention time in the dryer is 40 minutes with varying temperatures in each of three drying zones: Zone one 290 to 310° F., zone two 290 to 310° F. and zone three at 130 to 145° F. The rice exits the dryer with a moisture content of 7 to 11%.

The process can be altered to give a softer (less firm) finished product that is still an excellent product after a 5 minute stand.

By means of a longer retention time in the steamer (45 minutes) the rice contains 76 to 78% moisture. The drying retention time is maintained from 30 to 35 minutes at temperatures in zone 1 at 260 to 285° F.; zone 2 at 260 to 285° F. and zone 3 at 130 to 140° F. The rice exits the dryer at 7 to 11% moisture.

Finished Product

This instantized rice product will have a shear press value of 85 to 90 lbs/force at a 5 minute stand with equal volumes of rice and boiling water. The density of the finished product is slightly less than in Example 1; in the range of 375 to 430 grams pre liter.

This product is still far superior to other instant rice products. It is a softer (less firm) rice compared to Example 1 product, but still has a firm, chewy, rubbery texture. Separate kernels and fluffy rice are still maintained and there is a slightly higher moisture content after a 5 minute stand (69%).

EXAMPLE 3

Raw Material: Long grain milled parboiled rice substantially gelatinized.

Parboiled rice is metered into a flume tank at a rate of 750 lbs./hr. The water temperature is 205° F., and flume retention time is 15 seconds before the rice enters the front of the steamer (cooker). In the steamer the rice is cooked on a moving belt by means of topical water addition and steam addition from the top and bottom of the steamer belt (atmospheric pressure). The spray water temperature is 195 to 205° F. at a rate of approximately 175 pounds per hour and covers the entire rice bed. The rice is cooked to the desired moisture (72-74%) with a retention time of 40 minutes in the 39 foot long, 6 foot wide steamer. At the end of the steamer, the rice is flumed with unheated water (Maximum flume water temp. 100° F.) to a drain belt. At the drain belt, the rice is spread evenly onto the drain belt and excess surface water is dripped off before rice enters the dryer. The rice is evenly spread onto the dryer belt with a bladed real (fluffer—like a lawn mower real). Rice entering the drier is approximately ¾ to 1 inch deep on the belt. Retention time in the dryer is 40 minutes with varying temperatures in each of three drying zones: Zone one 290 to 310° F., zone two 290 to 310° F. and zone three at 130 to 145° F. The rice exits the dryer with a moisture content of 7 to 11%.

The process can be altered to give a very soft rice. This is achieved by over cooking the parboiled rice in the steamer. A retention time of 50 minutes is used which increases the kernel moisture to 82% will give a shear press value of 75 lbs/force. Therefore the rice is very soft and many kernels are split open. The rice is more sticky and there are less separate kernels. Most of the desired texture characteristics are lost. It is less chewy, less rubbery and somewhat mushy. The eating moisture content at a 5 minute stand is 72%.

EXAMPLE 4

Raw Material: Long grain milled parboiled rice substantially gelatinized.

Parboiled rice is metered into a flume tank at a rate of 750 lbs./hr. The water temperature is 205° F., and flume retention time is 15 seconds before the rice enters the front of the steamer (cooker). In the steamer the rice is cooked on a moving belt by means of topical water addition and steam addition from the top and bottom of the steamer belt (atmospheric pressure). The spray water temperature is 195 to 205° F. at a rate of approximately 175 pounds per hour and covers the entire rice bed. The rice is cooked to the desired moisture (72-74%) with a retention time of 40 minutes in the 39 foot long, 6 foot wide steamer. At the end of the steamer, the rice is flumed with unheated town water (Maximum flume water temp. 100° F.) to a drain belt. At the drain belt, the rice is spread evenly onto the drain belt and excess surface water is dripped off before rice enters the dryer. The rice is evenly spread onto the dryer belt with a bladed real (fluffer—like a lawn mower real). Rice entering the drier is approximately ¾ to 1 inch deep on the belt. Retention time in the dryer is 40 minutes with varying temperatures in each of three drying zones: Zone one 290 to 310° F., zone two 290 to 310° F. and zone three at 130 to 145° F. The rice exits the dryer with a moisture content of 7 to 11%.

The process can be altered to make a very smooth and firm desirable product which is ready in 7½ minutes, but not a 5 minute stand. The shear press value is 100 lbs/force. The rice is cooked in the steamer to a moisture of 72% at a 750 lbs/hr. infeed rate. The drying is conducted for a much longer time (56 minutes retention time in the dryer) at temperatures in the same range as Example 2. A slower dryer belt speed is used and the bed depth used is about ½ inch thicker (1¼ to 1½ inches thick).

The density is 450 to 500 grams per liter. This product is very smooth when rehydrated. It is firm and rubbery and has separate kernels. This is an excellant product when rehydrated for a 7½ minute stand. It is too firm and dry in 5 minutes (65% eating moisture).

EXAMPLE 5

Raw Material: Long grain milled parboiled rice substantially gelatinized.

Parboiled rice is metered into a flume tank at a rate of 780 lbs./hr. The water temperature is 205° F., and flume retention time is 15 seconds before the rice enters the front of the steamer (cooker). In the steamer the rice is cooked on a moving belt by means of topical water addition and steam addition from the top and bottom of the steamer belt (atmospheric pressure). The spray water temperature is 195 to 205° F. at a rate of approximately 175 pounds per hour and covers the entire rice bed. The rice is cooked to the desired moisture (74.5%) with a retention time of 45 minutes in the 39 foot long, 6 foot wide steamer. At the end of the steamer, the rice is flumed with unheated town water (Maximum flume water temp. 100° F.) to a drain belt. At the drain belt, the rice is spread evenly onto the drain belt and excess surface water is dripped off before rice enters the dryer. The rice is evenly spread onto the dryer belt with a bladed real (fluffer—like a lawn mower real). Rice entering the drier is approximately ¾ to 1 inch deep on the belt. Retention time in the dryer is 40 minutes with varying temperatures in each of three drying zones: Zone one 304° F., zone two 262° F. and zone three at 144° F. The rice exits the dryer with a moisture content of 7 to 11%.

Finished Product

This instantized rice product will have a shear press value of 60 to 69 lbs/force at a 5 minute stand with equal volumes of rice and boiling water.

This product is still superior to other instant rice products. It is a softer (less firm) rice compared to Example 1 product, but still has a firm, chewy, rubbery texture. Separate kernels and fluffy rice are still maintained and there is a slightly higher moisture content after a 5 minute stand (69%).

What is claimed is:

1. A process for producing an improved instantized parboiled rice which consisting essentially of incorporating about 68 to about 78 weight percent water into long grain milled parboiled rice in which the starch has been substantially gelatinized, drying said water-containing rice at temperatures from about 260° F. to about 325° F. to reduce the water content of said rice to about 6 to about 14% over a period of time to obtain rice having a texture with a shear press value in the range from about 60 to below 85 lbs/force and having about a 4½ to about 7½ minute stand recipe when an equal volume of rice is combined with ana equal volume of boiling water to produce an instantized eating quality parboiled finished rice product.

2. The process of claim 1 wherein the water incorporated into the long grain milled parboiled cell ranges from about 72 to about 76 weight percent.

3. The process of claim 1 wherein the water content of the long grain milled parboiled rice is reduced to about 7 to about 11 weight percent.

4. The process of claim 1 wherein said drying temperatures of said water-containing long grain milled parboiled rice are from about 260° F. to about 305° F.

5. The process of claim 1 wherein the drying time ranges from about 40 to about 50 minutes.

6. The process of claim 1 wherein the shear press value ranges from about 64 to about 74 pounds per force.

7. The process of claim 1 wherein the instantized parboiled rice product has a 5 minute stand.

* * * * *